Sept. 11, 1945.  J. L. CHANEY ET AL  2,384,453
INCLINOMETER
Filed Feb. 6, 1943
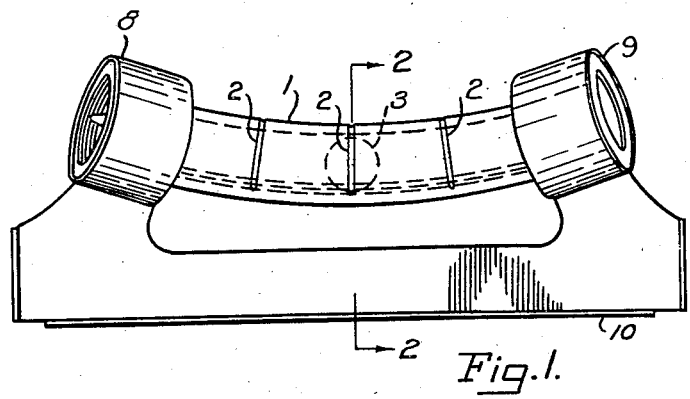
Fig.1.
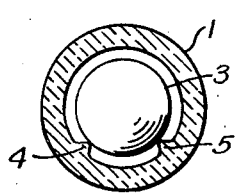
Fig.3.
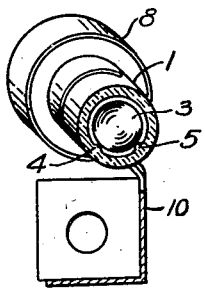
Fig.2.
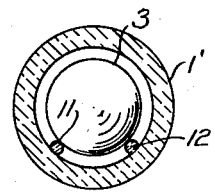
Fig.4.
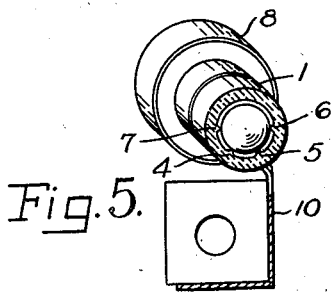
Fig.5.
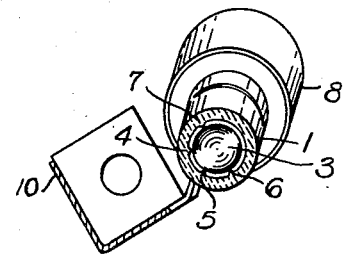
Fig.6.
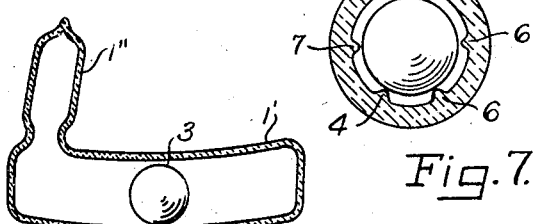
Fig.7.
Fig.8.
INVENTORS
John L. Chaney
George D. Hunt
BY
Staly & Mich
ATTORNEYS Patented Sept. 11, 1945

2,384,453

UNITED STATES PATENT OFFICE 2,384,453

INCLINOMETER

John L. Chaney and George D. Hunt, Springfield, Ohio; said Hunt assignor to The Ohio Thermometer Company, Springfield, Ohio, a corporation of Ohio Application February 6, 1943, Serial No. 475,026

8 Claims. (Cl. 33—206)

This invention relates to inclinometers, more particularly relating to inclinometers of the gravity-operated type and particularly to an inclinometer having a transparent liquid chamber, such as glass, and provided with a ball to denote the degree of inclination.

One of the objects of the invention is to provide an inclinometer of this type having a chamber provided with means such as parallel spaced raised portions on the interior wall of the chamber on which the ball rides to maintain the ball from frictional engagement with the wall of the chamber to reduce friction and also reduce friction by reason of any flaws in the wall of the chamber or on the ball such as pits, scratches, bubbles or glass seeds and also to reduce friction by reason of any foreign substances in the chamber such as particles of eroded chips of glass, dust and so forth.

A further object of the invention is to provide means such as to prevent the ball from chattering in the chamber in a more effective way by providing tracks which will impart to the ball a more uniform travel by causing it to roll in the same plane of travel.

A further object of the invention is to provide means of the character described which may be installed in an inclinometer having a tube formed of an integral piece of material such as glass to facilitate manufacture.

A further object of the invention is to provide an inclinometer which is adapted for use in connection with war aircraft such as dive bombers and in which a plurality of more than two raised portions are provided, two at least of which act to support the ball for level flying and others of such tracks act in conjunction with one of said first-mentioned tracks to support the ball in diving or climbing.

Other objects of the invention will appear from the accompanying description, drawing and claims.

In the accompanying drawing:

Fig. 1 is a side elevation of an inclinometer embodying the improvements.

Fig. 2 is a perspective view in section, the sections being taken on the line 2—2 of Fig. 1, but two track rails being shown in this view.

Fig. 3 is a transverse section on the line 2—2 of Fig. 1, but two track rails being shown in this view.

Fig. 4 is a transverse section showing a modification.

Fig. 5 is a perspective view in cross section showing a construction incorporating a plurality of more than two track rails.

Fig. 6 is a view similar to Fig. 5 but showing the position assumed by the parts in dive bombing.

Fig. 7 is a transverse section of the construction shown in Figs. 5 and 6 showing the position of the parts in level flying.

Fig. 8 is a modification showing the tube provided with an expansion chamber.

Referring to the drawing, 1 represents the chamber of the inclinometer, the chamber being formed of one integral piece of material such as glass in the nature of an elongated arcuate tube which has on one side thereof indicating marks 2. Located in the tube is a spherical ball 3 formed of any suitable material such as black glass or black agate, which is placed in the tube after one end of the tube has been sealed but before the sealing of the other end of the tube; the tube at the same time after the ball has been inserted being filled with a suitable damping liquid, preferably a light oil having sufficient viscosity or density to impart to the ball a desired sensitiveness and of a character to withstand any temperature to which it may be subjected.

As shown best in Figs. 2 and 3 the tube 1 during the moulding thereof is formed with two ribs, projections or raised portions forming track rails 4 and 5. These track rails are preferably integrally formed with the interior wall of the tube during the moulding of the tube by providing the inner core of the mould with suitably positioned grooves. These two track rails 4 and 5 are in parallel relation with each other and act to support the ball 3 in its movement to and fro in the tube. In Fig. 5 a plurality of more than two of these track rails are shown, preferably two additional rails indicated at 6 and 7. All of these rails are in parallel relation to each other and spaced in the present case preferably substantially 60° apart, although such spacing is not essential.

The tube in the present case is shown supported by brackets 8 and 9 which brackets are in turn supported by a suitably formed base 10.

In operation when the instrument is to be used only for level flying but two track rails such as the ones 4 and 5 may be employed to support the rail but in war aircrafts which are used not only dive bombing but for climbing two additional track rails such as shown at 6 and 7 will be used. In Fig. 6 which is the position of the parts assumed in diving it will be seen that the ball has left the rails 4 and 7 and is now riding on the rails 5 and 6. While it is not shown in the present case it will be understood that in climbing the ball will have left the rails 5 and 6 and will ride upon the rails 4 and 7.

An inclinometer such as described may be used not only to indicate the inclination of the body of the plane when climbing or descending but also the inclination of the wings of the planes in banking or turning.

While the preferable way of forming these rails is by moulding them integrally with the interior of the tube during the formation of the tube it is understood that the rails may be applied to the interior of the tube in other ways. In Fig. 4 there is shown a modification in which the rails are formed of separate strips or strings of material such as glass which is drawn out to the desired length, these strips being indicated at 11 and 12. They are preferably formed of glass and are inserted in the tube indicated at 1' before the same has been bent to form, the ends of the strips being secured to position in any suitable way and become welded to the tube throughout their entire length when the tube is heated for the purpose of bending it into shape into the arcuate form shown.

In Fig. 8 the tube indicated at 1' is shown provided with an expansion chamber 1'' which is desirable with some instruments.

Having thus described our invention, we claim:

1. A measuring instrument including an arcuate hermetically sealed tube of translucent material formed of a single piece of material such as to be free of joints, longitudinal parallel spaced ribs formed integrally with said tube on the inner face thereof, a gravity operated ball enclosed in the tube and rolling upon the ribs in slightly spaced relation with the interior face of the tube contiguous to the ribs, and a body of fluid confined within the tube hypassing the ball between the periphery of the latter and the interior of the tube as the ball rolls to and fro to dampen the movement of the ball, and graduations associated with the tube for gaging the relative movement of the ball.

2. A measuring instrument, including a tubular container, at least a portion of which is translucent, the opening through said tubular container being substantially circular in cross-section, integral longitudinal parallel ribs on the interior face of the tubular container, a traveling gravity operated member free for to and fro movement within the tube and maintained in relatively spaced approximately concentric relation with said opening in said tubular container by said ribs, bypass passages afforded thereby intermediate the traveling member and the wall of the tubular container, and a body of liquid confined within the container and possessing retarded flow from one side to the other of the traveling member through the bypass passages to govern the to and fro motion of the traveling member, the relative position of which may be observed through a translucent portion of the container.

3. As an article of manufacture, a round tube of translucent material having a substantially annular cross-section with a central circular opening, and integral longitudinal relatively spaced ribs projecting inwardly from the interior face of the tube, said tube with said integral ribs being a unitary homogeneous structure free of joints and of uniform characteristics as to temperature coefficient of expansion.

4. A measuring instrument including a one-piece elongated translucent liquid filled tubular body having a passage extending longitudinally therethrough, a gravity influenced body free for to and fro movement longitudinally of said passage confined therein, and spacer means located above the lower wall of said passage and extending therethrough for supporting said body in spaced relation with contiguous wall portions of said passage during its to and fro movement, said spacer means being formed of material having the same characteristics as that of said tubular body and being intimately secured thereto throughout its length.

5. A measuring instrument, including a liquid containing tube having a passage extending therethrough which is substantially circular in cross-section, a gravity influenced ball enclosed therein for to and fro motion longitudinally of the tube, locating means on the inner wall of said passage substantially centering the ball in approximately concentric relation with the cross sectional area of the passage, and bypass passages for the contained fluid through which the fluid may flow from one side to the other of the ball, said bypass passages being of substantially the same size above, below and at opposite sides of the ball.

6. An instrument of the character described comprising a one-piece closed integrally formed transparent elongated chamber having an internal passage therethrough, a plurality of spaced ribs projecting inwardly from the inner wall of said chamber into said passage forming tracks extending longitudinally thereof, said ribs being formed of the same material as that of said chamber and intimately bonded thereto throughout their length, said chamber being of unitary and integral construction maintaining a closed and sealed condition therein, and a ball within said internal passage supported on said ribs for uniform rolling moment through said chamber in predetermined spaced relation from the inner walls thereof.

7. A measuring instrument comprising a one-piece closed integrally formed transparent elongated chamber having an internal passage therethrough adapted to contain a quantity of damping liquid, a plurality of spaced ribs projecting inwardly from the inner wall of said chamber into said passage forming tracks extending longitudinally thereof, said ribs being formed as an integral part of said chamber providing a unitary construction free of joints and maintaining a completely sealed condition therein, and a ball within said internal passage supported on said ribs for uniform rolling moment through said chamber in predetermined spaced relation from the inner walls thereof.

8. A measuring instrument comprising a one-piece closed integrally formed transparent elongated chamber having an internal passage therethrough adapted to contain a quantity of damping liquid, said passage having a generally circular cross-section, a plurality of spaced ribs projecting inwardly from the inner wall of said chamber into said passage forming tracks extending longitudinally thereof, said ribs being formed as an integral part of said chamber providing a unitary construction free of joints and maintaining a completely sealed condition therein, and a ball within said internal passage supported on said ribs for uniform rolling moment through said chamber, said ball having a diameter less than that of said passage leaving an annular space around its periphery for a restricted flow of said damping liquid from one side thereof to the other.

JOHN L. CHANEY.
GEORGE D. HUNT.